(12) United States Patent
Keller et al.

(10) Patent No.: US 12,738,719 B2
(45) Date of Patent: Sep. 15, 2026

(54) GAS INSULATED ELECTRIC APPARATUS

(71) Applicant: Hitachi Energy Ltd, Zürich (CH)

(72) Inventors: Markus Keller, Winterthur (CH); Urs Kruesi, Wiesendangen (CH); Loic Fave, Fribourg (CH); Johannes Hengstler, Lufingen (CH); Moritz Boehm, Mellingen (CH); Roman Kochetov, Glattfelden (CH)

(73) Assignee: HITACHI ENERGY LTD, Zürich (CH)

( * ) Notice: Subject to any disclaimer, the term of this patent is extended or adjusted under 35 U.S.C. 154(b) by 168 days.

(21) Appl. No.: 18/686,597

(22) PCT Filed: Aug. 22, 2022

(86) PCT No.: PCT/EP2022/073332

§ 371 (c)(1),
(2) Date: Feb. 26, 2024

(87) PCT Pub. No.: WO2023/025723

PCT Pub. Date: Mar. 2, 2023

(65) Prior Publication Data

US 2024/0372339 A1 Nov. 7, 2024

(30) Foreign Application Priority Data

Aug. 27, 2021 (EP) .................................... 21193652

(51) Int. Cl.

*H02B 13/045* (2006.01)
*H01B 3/40* (2006.01)
*H02B 13/055* (2006.01)

(52) U.S. Cl.

CPC ............. *H02B 13/045* (2013.01); *H01B 3/40* (2013.01); *H02B 13/055* (2013.01)

(58) Field of Classification Search

CPC .... H02B 13/045; H02B 13/01; H02B 13/055; H01B 3/40; H01H 33/563; H01H 2033/566

(Continued)

(56) References Cited

U.S. PATENT DOCUMENTS 9,074,685 B2 7/2015 Strack et al.
10,818,407 B2 10/2020 Di-Gianni et al.

(Continued)

FOREIGN PATENT DOCUMENTS

CN 107210088 A 9/2017
EP 2960053 A1 12/2015

(Continued)

OTHER PUBLICATIONS

Indian Office Action, Indian Patent Application No. 202447013042, mailed Dec. 4, 2025, 6 pages.

(Continued)

*Primary Examiner* — Timothy J Thompson
*Assistant Examiner* — Michael F McAllister

(57) ABSTRACT

The disclosure relates to a gas insulated electric apparatus, which includes an enclosure, an electric high voltage appliance arranged inside the enclosure and a permeation barrier arranged within the enclosure and circumferentially surrounding the electric high voltage appliance, whereby the enclosure contains an insulation gas including at least 70% by volume of $CO_2$ and including an elevated and predetermined operating gas pressure level, and the permeation barrier includes a permeation layer surrounded on at least one side by a flow promoter layer and/or a surface activation and/or primer layer.

14 Claims, 3 Drawing Sheets

(58) Field of Classification Search
USPC ........................................................ 174/50
See application file for complete search history.

(56) References Cited

U.S. PATENT DOCUMENTS

| | | | | |
|---|---|---|---|---|
| 2006/0261916 | A1 | 11/2006 | Molyneux et al. | |
| 2016/0043533 | A1* | 2/2016 | Tehlar .................. | H02B 13/035<br>73/19.01 |
| 2020/0067285 | A1* | 2/2020 | Richter ................ | H02B 13/045 |

FOREIGN PATENT DOCUMENTS

| | | | |
|---|---|---|---|
| EP | 3416178 | A1 | 12/2018 |
| JP | 2018521708 | A | 8/2018 |
| JP | 2020189224 | A | 11/2020 |

OTHER PUBLICATIONS

International Search Report and Written Opinion, International Application No. PCT/EP2022/073332, mailed Nov. 14, 2022, 15 pages.

Korean Office Action and English Translation, Korean Patent Application No. 10-2024-7006117, mailed Feb. 21, 2025, 11 pages.

* cited by examiner

GAS INSULATED ELECTRIC APPARATUS

CROSS REFERENCE TO RELATED APPLICATIONS

This application is a 35 U.S.C. § 371 national stage application of PCT International Application No. PCT/EP2022/073332 filed on Aug. 22, 2022, which in turn claims priority to European Patent Application No. 21193652.1, filed on Aug. 27, 2021, the disclosures and content of which are incorporated by reference herein in their entireties.

TECHNICAL FIELD

The present disclosure relates to a gas insulated electric apparatus comprising an enclosure, an electric high voltage appliance arranged inside the enclosure and a permeation barrier arranged within the enclosure and circumferentially surrounding the electric high voltage appliance, whereby the enclosure contains an insulation gas comprising at least 70% by volume of $CO_2$ and comprising an elevated and pre-determined operating gas pressure level. The present disclosure further relates to a method for manufacturing a gas insulated electric apparatus comprising an electric high voltage appliance, comprising the step of: Manufacturing an enclosure for arranging the electric high voltage appliance therein.

BACKGROUND

In gas insulated electric apparatuses such as medium and high voltage switchgears or control gears an electrical active part is arranged in a gas-tight enclosure or housing. The enclosure or housing defines an insulating space that is arranged to contain an insulation gas at an elevated pressure, which can be several bars. The insulating space separates the enclosure from the electrical active part without letting electrical current pass through.

The insulation gas serves as an electric insulation medium and prevents electric discharge between the enclosure and the electrical components inside the enclosure. Further, the insulation gas serves as a cooling medium for suppressing temperature rise due to electric current. In a switchgear which typically comprises a circuit breaker and/or a disconnector, the insulation gas also serves as an arc-extinguishing medium for extinguishing arcs that may occur at the switching operation. Conventionally, sulphur hexafluoride gas, $SF_6$ or $SF_6$ gas, has been widely used as insulation gas. However, in view of the known environmental drawbacks of $SF_6$, the use of other insulation gases has been proposed, such as carbon dioxide, $CO_2$, gas or other gases containing $CO_2$.

Generally, the enclosure of the gas insulated electrical apparatuses is filled with the insulation gas up to a pre-determined operational rated gas pressure level before it is taken into operation. The pre-determined pressure level can be chosen depending on the insulation gas, switched current/voltage and/or the switching capacity of the electric apparatus. The pressure level is measured during the operation continuously or at pre-determined intervals.

If the gas pressure level is below a pre-defined lowest acceptable pressure level, also called alarm level, an alarm is generated to the operator. If the alarm is generated, the enclosure should be filled with insulation gas to the pre-determined operational gas pressure level. If the enclosure is not replenished, there is a risk that the insulation gas pressure will continue to decrease, and consequently operational disturbances are caused.

Normally, the electrical apparatus has a pre-defined blocking pressure level, also named lock-out gas pressure level, and when the blocking pressure level is reached, the function of the gas insulated electric apparatus will be blocked and ceased. When the gas insulated electrical apparatus is a switchgear, it is usually configured to react in one of two ways: either the function of the gas insulated electric apparatus will be blocked such that it will not be possible to open or close an electric contact of the switchgear, or the electric contact will be forced open and stay open.

The refilling operation and monitoring of the alarms in the electrical apparatuses are time and labour consuming tasks. Therefore, there is a need to reduce service occasions while operational disturbances of gas insulated electrical apparatuses are effectively avoided.

SUMMARY

It is therefore an object of the present disclosure to maintain properties of an insulation material of the enclosure as best as possible for avoiding $CO_2$ leakage.

The object of the present disclosure is solved by the features of the independent claims. Alternative implementations are detailed in the dependent claims.

Thus, the object is solved by a gas insulated electric apparatus comprising an enclosure, an electric high voltage appliance arranged inside the enclosure and a permeation barrier arranged within the enclosure and circumferentially surrounding the electric high voltage appliance, whereby the enclosure contains an insulation gas comprising at least 70% by volume of $CO_2$ and comprising an elevated and pre-determined operating gas pressure level, the permeation barrier comprises a permeation layer surrounded on at least one side by a flow promoter layer and/or a surface activation and/or primer layer.

In order to lower the global warming potential, GWP, alternative isolation gas mixtures are used other than $SF_6$, which contain molecules such as $CO_2$ having a lower kinetic diameter and/or a higher solubility in the respective material of an enclosure comprising in particular of epoxy based composite as insulator. Tests have demonstrated that $CO_2$ alternative isolation gas mixtures permeate at high rates through such epoxy based enclosure, which leads to a significant pressure drop and finally results in reduced dielectric and/or current switching behaviour of the gas insulated electric apparatus respectively the epoxy based composite manufactured enclosure. In addition, $H_2O$ can permeate into the insulation space defined by the enclosure and can lead directly or indirectly to decomposition of the insulation gas, to corrosion of components inside the gas insulated electric apparatus such as the electric high voltage appliance or to lower dielectric withstand of the enclosure.

Thus, a key point of the present disclosure is therefore to provide a layer of in particular a low permeation material, LPM, having a very low permeation coefficient for the respective gas i.e., $CO_2$ as permeation barrier. For allowing a simple implementation by using for example wide band strips or sheets as permeation barrier, the described solution proposes to provide on at least one side of the permeation layer the flow promoter layer and/or the surface activation and/or primer layer. Such way air bubbles and/or cracks leading to potential failure of the epoxy based composite insulator respectively enclosure under dielectric or environmental stress can be effectively avoided, while a simple manufacturing of the permeation barrier and thus cost-effective manufacturing of the gas insulated electric apparatus becomes available. In addition, the proposed solution avoids permeation through the epoxy based composite insulator respectively enclosure, which avoids a pressure drop within the enclosure resulting in stable and reliable dielectric and/or current switching behaviour.

The enclosure may comprise a tube-like or conical tube-like shape and/or can be hermetically sealed. Thus, the insulation gas may completely surround the electric high voltage appliance. The permeation barrier arranged within the enclosure means in particular that the permeation barrier is encapsulated within the enclosure, thus for example not visible from an outside or inside of the enclosure. The enclosure can be filled with $CO_2$ as insulation gas by at least 70% by volume, but may also be completely filled with $CO_2$. The remainder up to 100% by volume in the insulation gas may comprise for example oxygen $O_2$ or another gas to an extent of less than 30% by volume. In some embodiments, the operating gas pressure level is from 1.0 MPa up to 1.2 MPa.

The permeation barrier may extend across the complete lateral inner surface of the enclosure. Further, the permeation layer can be surrounded on its complete or at least on its partial surface with the flow promoter layer and/or the surface activation and/or primer layer. Thereby, the flow promoter layer and/or the surface activation and/or primer layer can be provided on one side of the permeation layer or on both sides of the permeation layer. The enclosure can be sealed with one or more sealings, for example made of a polymeric material of various types, for example NBR or EPDM rubber, but not limited to these materials.

In an implementation the permeation layer comprises ethylene vinyl alcohol, EVOH, and/or aluminum oxide foil. EVOH thus provides an $CO_2$ but also an oxygen or hydrocarbon barrier. EVOH is advantageous in that it is highly transparent, weather resistant, oil and solvent resistant, flexible, moldable, recyclable, and printable. EVOH can be applied by coextruding or laminating. The permeation layer may comprise a thickness of 0.0001, 0.0005, 0.001, 0.01, 0.1, 0.5, 1, 2, 5 or 10 mm. Aluminum oxide foil may have a thickness of 0.016 or 0.024 mm. Besides that other materials can be used for mitigating permeation of the insulation gas. The surface activation layer may result from plasma and/or chemical treating and/or chemical bonding the permeation layer. As primer any suitable material may be used for priming the enclosure and the permeation layer.

In another limitation the permeation layer, the flow promoter layer, and/or the surface activation and/or primer layer are provided as a sheet and/or as a strip, such as overlapping wrapped strips, preferably overlapping in axial and/or circumferential direction. The strips can be provided as wide band strips. In some embodiments, the sheets and/or the strips overlap across the complete axial and/or circumferential extension of the respective layer. In circumferential extension the sheet and/or the strip may comprise no gap, a gap or may overlap.

In another implementation the gas insulated electric apparatus comprises the flow promoter layer, whereby the flow promoter layer comprises a fleece and/or mesh. The fleece and/or mesh may comprise polyester, aramid, a synthetic fiber, a textile fiber and/or any mixture thereof. Further materials may comprise polyamide such as nylon, Kevlar, Nomex, trogamide, and combinations of polyester, polyamide, and polypropylene. The flow promoter layer may comprise a thickness of 0.1, 0.3, 0.5, 1 or 2 mm.

In another implementation the permeation barrier is arranged within the enclosure adjacent to an inside of the enclosure and/or closer to the inside than to the outside of the enclosure. Having the permeation barrier close to the inside bears the advantage that only very few radial material exists within the enclosure for saturating the insulating gas therein. Thus, the permeation barrier can be arranged as close as possible to the inside of the enclosure.

According to another implementation the gas insulated electric apparatus comprises a plurality of permeation barriers arranged in particular distance to each other within the enclosure. Having a plurality of permeation barriers and/or a permeation barrier with higher thickness results in lower permeation. Thus, a limit-thickness of a permeation barrier and/or number of permeation barriers may be necessary to ensure a specific leakage rate is not exceeded such that a specified lifetime before a refill with insulating gas is required can be ensured.

In another implementation the electric high voltage appliance is provided as a high voltage interrupter. The electric apparatus can be provided as a gas insulated live tank circuit breaker, as a gas insulated dead tank circuit breaker, as a bushing or as a gas insulated switchgear. Alternatively, the electric apparatus can be provided as a control gear such as a gas insulated instrument transformer. In either one of these apparatuses it will be of great value to have an apparatus that will have a reliable functionality for many years without requiring refilling of insulation gas.

In another implementation the electric apparatus is provided as an outdoor gas insulated electric apparatus. In this respect the enclosure can be covered with silicone sheds. Alternatively, in case the enclosure is provided as epoxy based composite insulator, layer of the insulator can be imbedded within the silicone sheds following the same principles described.

The object is further solved by a method for manufacturing a gas insulated electric apparatus comprising an electric high voltage appliance, comprising the steps of:

Manufacturing an enclosure for arranging the electric high voltage appliance therein, and Applying, during manufacturing, a permeation barrier within the enclosure circumferentially surrounding the electric high voltage appliance, whereby the permeation barrier comprises a permeation layer surrounded on at least one side by a flow promoter layer and/or a surface activation and/or primer layer.

The enclosure may be manufactured by impregnation of a liquid epoxy on a core having a negative form of an inner surface of the enclosure. The liquid epoxy flows and should fill all cavities. The proposed flow promoter layer and/or surface activation and/or primer layer helps to avoid that air bubbles remain and/or cracks arise, which otherwise may lead to potential failure of the epoxy based composite insulator respectively enclosure under dielectric or environmental stress.

According to an implementation the enclosure comprises an epoxy based composite isolator, the epoxy based composite isolator comprises wet wound fibers and/or the manufacturing comprises vacuum impregnating the epoxy based composite isolator.

In one implementation the method comprises the step of:

Applying, during manufacturing, first the flow promoter layer and/or the surface activation and/or primer layer, second the permeation layer, and/or third another promoter layer and/or another surface activation and/or primer layer.

In another implementation the method comprises the steps of:

Filling the enclosure with an insulation gas comprising at least 70% by volume of $CO_2$ and comprising an elevated and pre-determined operating gas pressure level, and hermetically sealing the enclosure.

Further implementations and advantages of the method are directly and unambiguously derived by the person skilled in the art from the apparatus as described before.

BRIEF DESCRIPTION OF DRAWINGS

These and other aspects of the present disclosure will be apparent from and elucidated with reference to the implementations described hereinafter.

In the Drawings.

DETAILED DESCRIPTION

Figures 1A, 1B:
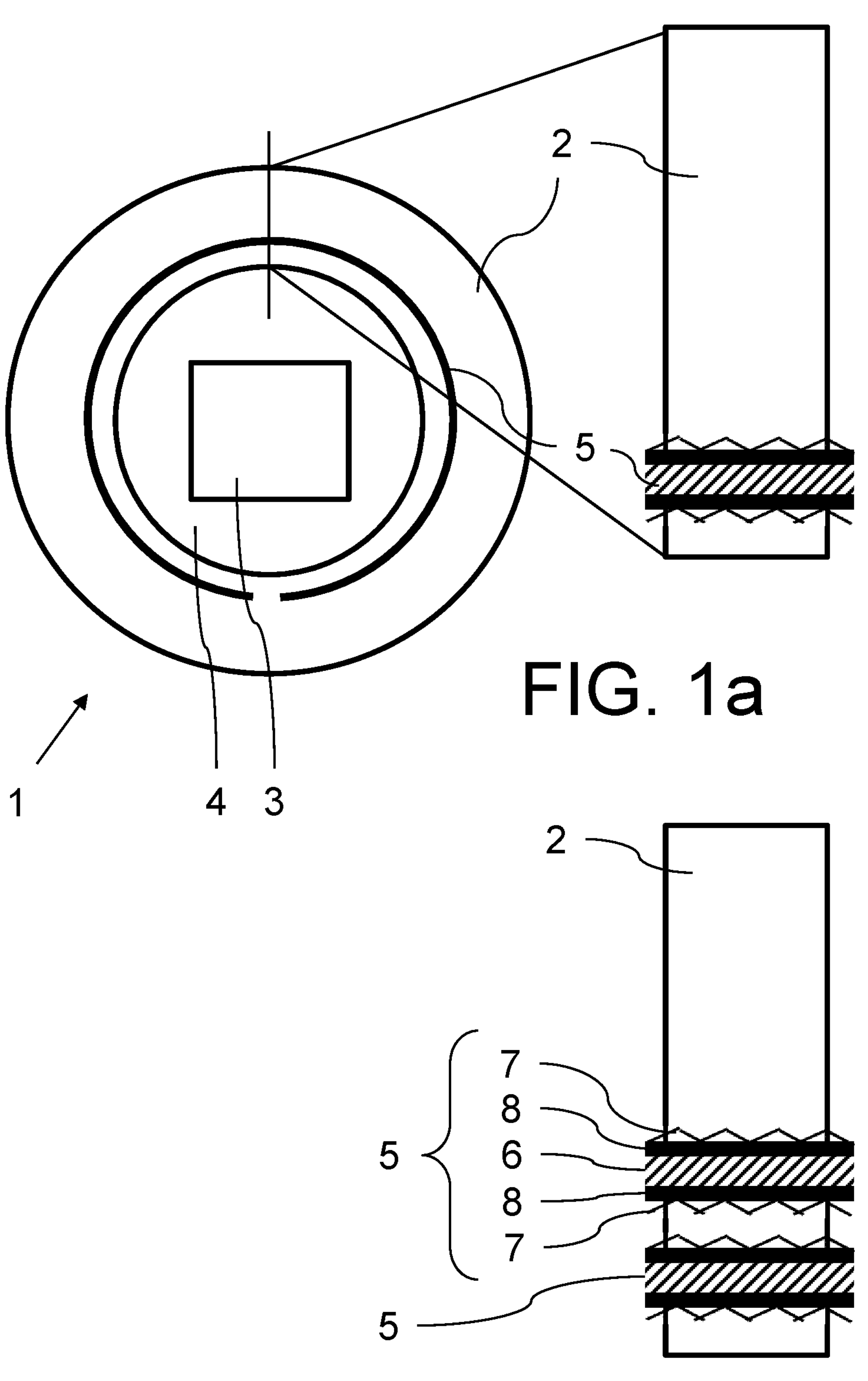
FIG. 1*a* shows a gas insulated electric apparatus with an enlarged part of an enclosure of the apparatus in a schematic top view according to an exemplary implementation.
FIG. 1*b* shows an enlarged part of the enclosure of the apparatus in a schematic top view according to a further exemplary implementation.

FIGS. 1*a* and 1*b* show a gas insulated electric apparatus 1 according to an exemplary implementation in a schematic top view. The gas insulated electric apparatus can be provided a gas insulated circuit breaker, finding its application for example as a gas insulated live tank circuit breaker, a bushing or a gas insulated dead tank circuit breaker. Alternatively, the gas insulated electric apparatus may be a gas insulated switchgear, or a control gear such as a gas insulated instrument transformer. The gas insulated apparatus can be suitable for use outdoors.

The gas insulated electric apparatus 1 generally comprises an electrically insulating enclosure 2 having a shape of a tube shown in top view with a wall made of a polymeric material and/or a composite material, in particular an epoxy based composite material as insulator capable to resist a pressure inside the enclosure 2. The enclosure 2 is typically manufactured by wet-wound fibers and/or in a vacuum impregnation process, thus resulting in a high mechanical strength and good dielectric properties of the insulator. Inside the enclosure 2 arranged is an electric high voltage appliance 3, which is provided as a high voltage interrupter and is only schematically shown in FIG. 1. The enclosure 2 is hermetically sealed and filled with an insulation gas 4, which comprises at least 70% by volume of $CO_2$ at an elevated and pre-determined operating gas pressure level ranging from 1.0 MPa up to 1.2 MPa.

Figure 2:
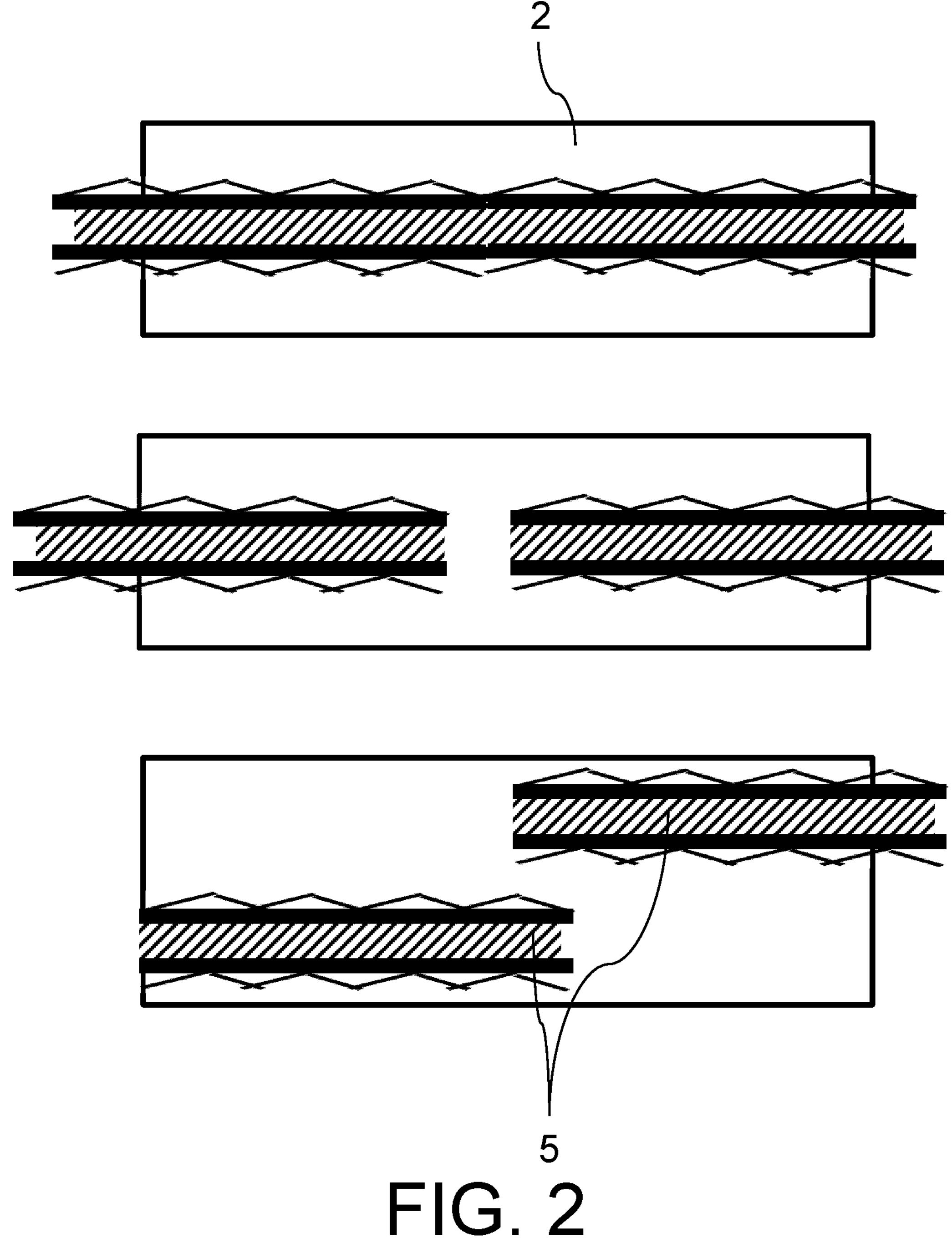
FIG. 2 shows an enlarged parts of enclosures of the apparatus in a schematic top view according to further exemplary implementations.
Figure 3:
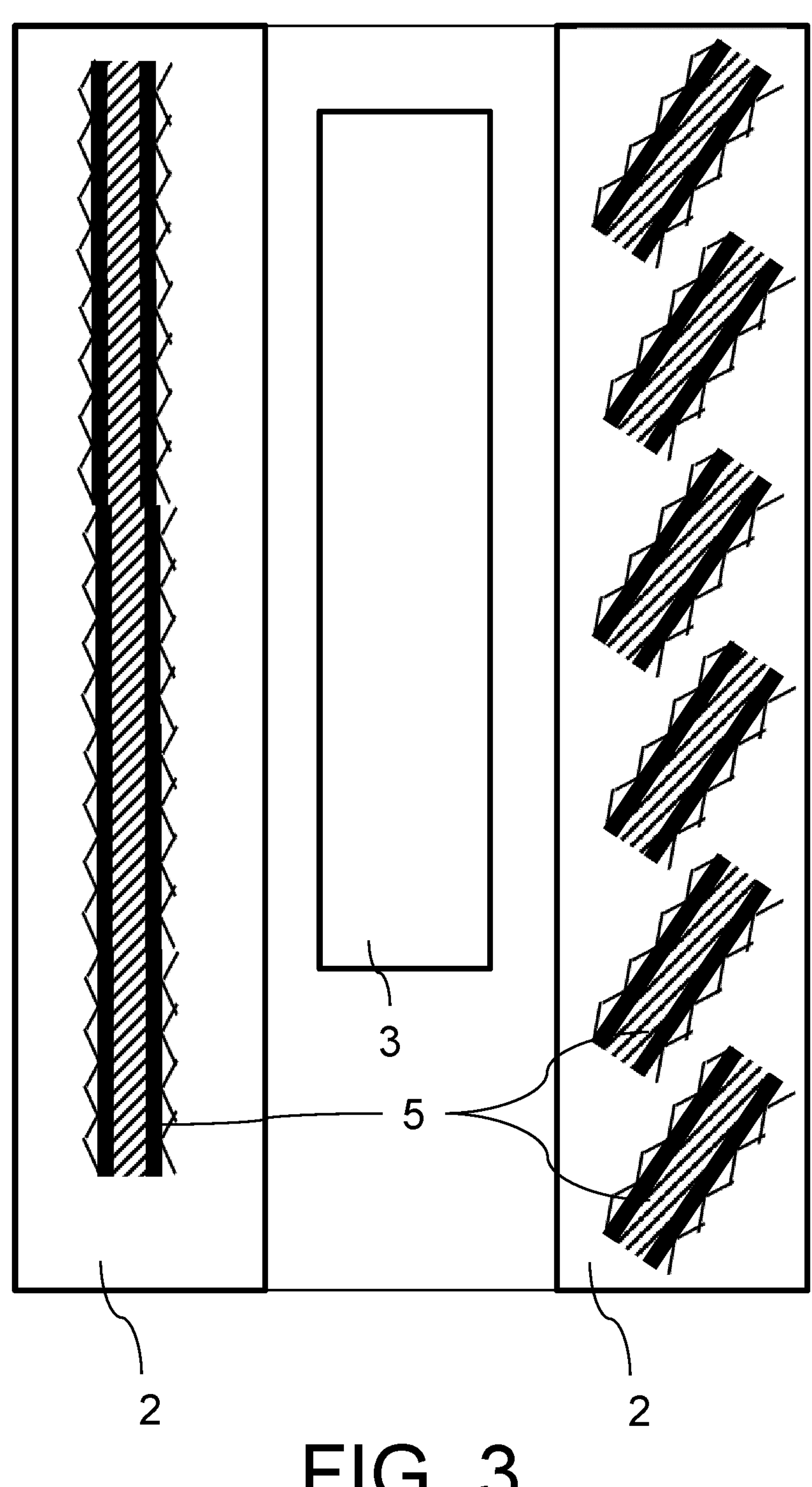
FIG. 3 shows the gas insulated electric apparatus in a schematic side view according to the exemplary implementations.

Within the enclosure a permeation barrier 5 is provided, which circumferentially surrounds the electric high voltage appliance 3. Circumferentially, as shown in FIG. 2 in the top, the permeation barrier 5 can have no circumferential gap, can have a circumferential gap, as shown in FIG. 2 in the middle, or can be arranged circumferentially overlapping, as shown in FIG. 2 on the bottom. Without gap, the permeation barrier 5 fully respectively completely extends around the electric high voltage appliance 3. The gap might be 1, 2, 5 or 10 mm wide. In axial direction, depicted in FIG. 3, the permeation barrier 5 may also cover the complete axial extension of the enclosure 2, as shown on the left side of FIG. 3. Alternatively, as shown on the right side of FIG. 3, permeation barrier 5 can be arranged in an overlapping manner. Overlapping means that in radial direction the electric high voltage appliance 3 is always surrounded by any of the various permeation barriers 5.

Generally, the permeation barrier 5 may be provided as a sheet and/or as a strip, for example as said overlapping wrapped strips. Also, as depicted in FIG. 1*b*, multiple layers of individual permeation barriers 5 can be present within the enclosure 2 arranged distant to each other. Thereby, as shown in FIG. 1*a*, the permeation barrier 5 is arranged inside the enclosure 2 adjacent to an inside respectively inner surface of the enclosure 2. In other words, the permeation barrier 5 is provided closer to the inside than to the outside of the enclosure 2. The outside respectively outer surface of the enclosure 2, i.e., the surface facing the surroundings of the enclosure 2, can comprise a plurality of sheds, not shown. The sheds may extend along the whole or partial length of the enclosure.

When manufacturing the enclosure 2, epoxy composites may be placed around a core representing a negative form of the inner surface of the designated enclosure 2, followed by placing the permeation barrier 5 onto the epoxy composites and again followed by another layer of epoxy composites up to the designated outer surface of the designated enclosure 2. When the enclosure 2 is cured, the core can be removed and the electric high voltage appliance 3 can be placed within the enclosure 2. The enclosure 2 is sealed and filled with the insulation gas 4 up to the operating gas pressure level.

Referring again to FIGS. 1*a* and 1*b*, permeation barrier 5 comprises a thin layer of a Low Permeation Material, LPM, having a very low permeation coefficient for the respective insulation gas 4 as permeation layer 6. Said permeation layer 6 can be applied once to form a single layer or multiple times to increase effectiveness if very low permeation rates are required. As explained before, in simplest implementation the permeation layer 6 can be formed of a sheet of LPM being wrapped once around the enclosure 2 during manufacturing the same. For practical reasons, the permeation layer 6 can be made of wide band strips instead of a single sheet of LPM. These strips are wrapped with or without overlap depending on the permeation performance needed. The permeation layer 6 can include ethylene vinyl alcohol, EVOH and/or can be provided as aluminum oxide foil, or other materials suitable for avoiding permeation of the insulating gas 4.

In order to achieve a sufficient impregnation and/or adhesion with such sheets or wide strips in composite materials such as epoxy based composite enclosures, potentially resulting in air bubbles or cracks leading to failure of the insulation enclosure 2 under dielectric or environmental stress, impregnation is improved by providing a flow promoter layer 7, while adhesion is improved by providing a surface activation and/or primer layer 8. Thus, either both the flow promoter layer 7 and the surface activation and/or primer layer 8 can be present, while also only one of the flow promoter layer 7 and the surface activation and/or primer layer 8 may be present. Also, only one side of both sides of the permeation layer 6 can be equipped with the flow promoter layer 7 and/or the surface activation and/or primer layer 8.

The flow promoter layer 7 comprises fleece and/or mesh, such as for example polyester, aramid, textiles, or any combination of mixture thereof. The thickness of the promoter layer 7 may range between 0.3 to 2 mm, preferably 1 mm. The surface activation and/or primer layer 8 can be applied by plasma treating, chemical bonding and/or chemical treating the permeation layer 6 for activating the surface of the permeation layer 6. The thickness of the surface activation and/or primer layer 8 may range from a 0.5 μm to 1 mm, for example 1 μm. The permeation layer 6 may comprise a thickness of 0.0001, 0.0005, 0.001, 0.01, 0.1, 0.5, 1, 2, 5 or 10 mm.

While the present disclosure has been illustrated and described in detail in the drawings and foregoing description, such illustration and description are to be considered illustrative or exemplary and not restrictive; the present disclosure is not limited to the disclosed implementations. Other variations to be disclosed implementations can be understood and effected by those skilled in the art in practicing the claimed subject matter, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

1 electric apparatus
2 enclosure
3 electric high voltage appliance
4 insulation gas
5 permeation barrier
6 permeation layer
7 promoter layer
8 surface activation and/or primer layer

The invention claimed is:

1. A gas insulated electric apparatus comprising:
an enclosure, an electric high voltage appliance arranged inside the enclosure, and a permeation barrier arranged within the enclosure and circumferentially surrounding the electric high voltage appliance, whereby
the enclosure contains an insulation gas comprising at least 70% by volume of $CO_2$ and comprising an elevated and pre-determined operating gas pressure level,
the permeation barrier comprises a permeation layer surrounded on at least one side by a flow promoter layer and/or a surface activation and/or primer layer, and
the permeation layer comprises ethylene vinyl alcohol (EVOH) and/or aluminum oxide foil.

2. The gas insulated electric apparatus of claim 1, whereby the permeation layer, the flow promoter layer, and/or the surface activation and/or primer layer are provided as a sheet and/or as a strip.

3. The gas insulated electric apparatus of claim 1, comprising the flow promoter layer, whereby the flow promoter layer comprises a fleece and/or mesh.

4. The gas insulated electric apparatus of claim 1, whereby the permeation barrier is arranged within the enclosure adjacent to an inside of the enclosure and/or closer to the inside than to the outside of the enclosure.

5. The gas insulated electric apparatus of claim 1, comprising a plurality of permeation barriers arranged in particular distance to each other within the enclosure.

6. The gas insulated electric apparatus according to claim 1, wherein the electric high voltage appliance is provided as a high voltage interrupter.

7. The gas insulated electric apparatus according to claim 1, wherein the electric apparatus is provided as a gas insulated live tank circuit breaker, as a gas insulated dead tank circuit breaker, as a bushing or as a gas insulated switchgear.

8. The gas insulated electric apparatus according to claim 1, wherein the electric apparatus is provided as an outdoor gas insulated electric apparatus.

9. A method for manufacturing a gas insulated electric apparatus comprising an electric high voltage appliance, comprising the steps of:
manufacturing an enclosure for arranging the electric high voltage appliance therein, and
applying, during manufacturing, a permeation barrier within the enclosure circumferentially surrounding the electric high voltage appliance, whereby
the permeation barrier comprises a permeation layer surrounded on at least one side by a flow promoter layer and/or a surface activation and/or primer layer, and
the permeation layer comprises ethylene vinyl alcohol (EVOH) and/or aluminum oxide foil.

10. A method according to claim 9, whereby the enclosure comprises an epoxy based composite isolator, wherein the epoxy based composite isolator comprises wet wound fibers and/or the manufacturing comprises vacuum impregnating the epoxy based composite isolator.

11. A method according to claim 9, comprising the step of:
applying, during manufacturing, first the flow promoter layer and/or the surface activation and/or primer layer, second the permeation layer, and/or third another promoter layer and/or another surface activation and/or primer layer.

12. A method according to claim 9, comprising the steps of:
filling the enclosure with an insulation gas comprising at least 70% by volume of $CO_2$ and comprising an elevated and pre-determined operating gas pressure level, and
hermetically sealing the enclosure.

13. The gas insulated electric apparatus of claim 1 wherein the permeation layer, the flow promoter layer, and/or the surface activation and/or primer layer are provided as overlapping wrapped strips.

14. The gas insulated electric apparatus of claim 1 wherein the permeation layer, the flow promoter layer, and/or the surface activation and/or primer layer are provided as overlapping wrapped strips that overlap in an axial and/or circumferential direction.

* * * * *